(12) United States Patent
Gandikota et al.

(10) Patent No.: US 11,359,069 B2
(45) Date of Patent: Jun. 14, 2022

(54) PLASTIC COMPOSITION WITH SPENT FILTER MEDIA FILLER

(71) Applicant: Kent Corporation, Muscatine, IA (US)

(72) Inventors: Somayajulu Venkata Satya Gandikota, West Des Moines, IA (US); Jeff Underwood, Muscatine, IA (US); David Allen Grewell, Ames, IA (US)

(73) Assignee: KENT CORPORATION, Muscatine, IA (US)

( * ) Notice: Subject to any disclaimer, the term of this patent is extended or adjusted under 35 U.S.C. 154(b) by 308 days.

(21) Appl. No.: 16/511,633

(22) Filed: Jul. 15, 2019

(65) Prior Publication Data

US 2020/0024422 A1 Jan. 23, 2020

Related U.S. Application Data

(60) Provisional application No. 62/700,401, filed on Jul. 19, 2018.

(51) Int. Cl.
| | | |
|---|---|---|
| *C08K 3/36* | (2006.01) | |
| *C08J 3/20* | (2006.01) | |
| *B29B 7/90* | (2006.01) | |
| *A01K 1/01* | (2006.01) | |
| *A47G 21/04* | (2006.01) | |
| *B29K 509/02* | (2006.01) | |

(52) U.S. Cl.
CPC .............. *C08K 3/36* (2013.01); *A01K 1/0114* (2013.01); *A47G 21/04* (2013.01); *B29B 7/90* (2013.01); *C08J 3/203* (2013.01); *A47G 2400/10* (2013.01); *B29K 2509/02* (2013.01)

(58) Field of Classification Search
CPC .......... C08K 3/36; C08J 3/203; A01K 1/0114; A47G 21/04; A47G 2400/10; B29B 7/90; B29K 2509/02

See application file for complete search history.

(56) References Cited

U.S. PATENT DOCUMENTS

| | | |
|---|---|---|
| 8,479,409 B2 | 7/2013 | Johal |
| 9,340,466 B2 | 5/2016 | Johal |
| 9,670,105 B2 | 6/2017 | Johal |
| 9,873,640 B2 | 1/2018 | Johal |

FOREIGN PATENT DOCUMENTS

WO 2019/027473 A1 2/2019

*Primary Examiner* — Edward J Cain

(74) *Attorney, Agent, or Firm* — Fitch, Even, Tabin & Flannery LLP

(57) ABSTRACT

Spent filter media material may be blended with a classic material, such as high-density polyethylene, polypropylene, polybutylene succinate, or polylactic acid, to form a filled plastic composition. The spent filter media may include spent diatomaceous earth, spent perlite, and/or residues thereof. The composition may be performed by co-extruding a mixture of the plastic material and the spent filter media. Surprisingly, the spent filter media may be used as-supplied and without the need to dry the material. The resulting plastic composite material has numerous uses, including, for example, litter scoops and eating utensils.

13 Claims, 15 Drawing Sheets

PLASTIC COMPOSITION WITH SPENT FILTER MEDIA FILLER

CROSS-REFERENCE TO RELATED APPLICATION

This application claims benefit of U.S. Provisional Application No. 62/700,401, filed Jul. 19, 2018, which is hereby incorporated herein by reference in its entirety.

FIELD

The disclosure is in the field of filled plastic compositions and methods for preparing same.

BACKGROUND

Vacuum filtration is commonly used in the manufacture of a variety of agricultural, food, beverage, and biotechnology industries. Production scale vacuum filtration systems, such as rotary drum vacuum filters, leaf filters, and the like, typically employ filtration aids. These aids range from fibers, cloths, and the like to particulate materials such as clays, diatomaceous earth, carbon, perlite, cellulosics and associated materials. Such filter media materials retain both insoluble and soluble impurities by various physicochemical means. Particulate materials are also sometimes added to the prefiltration supernatants and subsequently recovered from the filter as a high moisture filter cake as it accumulates on the filter surface.

Diatomaceous earth (DE) is a widely used filter medium. Diatomaceous earth is frequently used, alone or in conjunction with other process aids, to clarify water, beverages including beers, wines, juices and the like, and also to clarify food ingredients such as maltodextrins, syrups and the like. Sometimes, activated carbon is added to the diatomaceous earth. Further, material such as perlite can be used in place of diatomaceous earth as filter media and/or filter aids.

An undesirable and problematic aspect of filtration systems that employ a filtration aid is the disposal of the used (spent) filtration aid. Spent filter media contains a significant amount of water, and generally also contains particulates and other material such as carbon and nutrients retained from the filtration stream, and minerals. For this reason, spent filter media is subject to microbial growth. Moreover, while there are numerous applications for virgin diatomaceous earth, the organic material that is entrapped in the spent diatomaceous earth can be undesirable in such applications. For example, organics are deemed undesired in potting soil mixes and seed bedding soils. Because of the significant cost and time entailed in the recycling of filtration aids, often the spent filter media is simply disposed of in a landfill.

A number of methods for drying spent filter media are known, as taught, for instance, in U.S. Pat. Nos. 8,479,409; 9,340,466; 9,670,105; and 9,873,640. Generally, these patents describe a process of drying spent diatomaceous earth by blending the diatomaceous earth with a dry material to form compositions useful in various applications, these including top dressings, soil amendments, and fertilizers in lawn care applications. It is desired to find additional uses for spent diatomaceous earth filter media.

Further, there is interest in preparing sustainable and/or recycled materials that can re-direct used materials into new uses instead of simply ending up in a landfill. In this regard, it would be desirable to find alternative uses for spent filter media, used plastic materials, and related materials.

SUMMARY

It has now been found that spent filter media may be used as a filler in plastic materials, in particular for petroleum-derived and plant-derived plastic materials such as high-density polyethylene, recycled high density polyethylene, polybutylene succinate, and polylactic acid. Such spent filter media can include diatomaceous earth, perlite, and the like. To form a filled plastic composition, a plastic material and spent filter media are provided, and the plastic material is blended with the spent filter media to form a filled plastic composition. Surprisingly, the filter media may be used as-supplied, with a typical water content ranging from 30-40%, without the need to dry the filter media. Generally, the spent filter media contains from 20-50% by total weight water and filtrates, such as organic filtrates and inorganic mineral filtrates. The diatomaceous earth or perlite may be used in an amount ranging from 1-100% by weight of the plastic material in forming the composition, this weight referring to the as-supplied weight of the filter media material including water.

The plastic material should be a thermoplastic material and the blending may be performed by melting the plastic material and dispersing the spent filter media material therewithin. This may be accomplished by co-extruding a mixture of the plastic material and the spent diatomaceous earth and/or perlite. At least one zone in the extruder should be at a sufficiently high temperature to allow for flashing or off-gassing of the water that is present in the spent filter media. The heat in the extruder may also cause some organic material present in the spent filter media to degrade or burn off. For this reason, the amount of diatomaceous earth or diatomaceous earth residue and other residue from spent filter media material present in the final extruded product will be less than the original amount of wet spent filter media on a percentage basis.

The plastic material thus formed has numerous uses. The material may be supplied to a manufacturer as a raw material, and may be fashioned into various useful tools or forms. For example, the filled plastic composite material may take the form of a slotted scoop for animal litters or a utensil (such as a spoon) for human food use.

DETAILED DESCRIPTION

Figure 1:
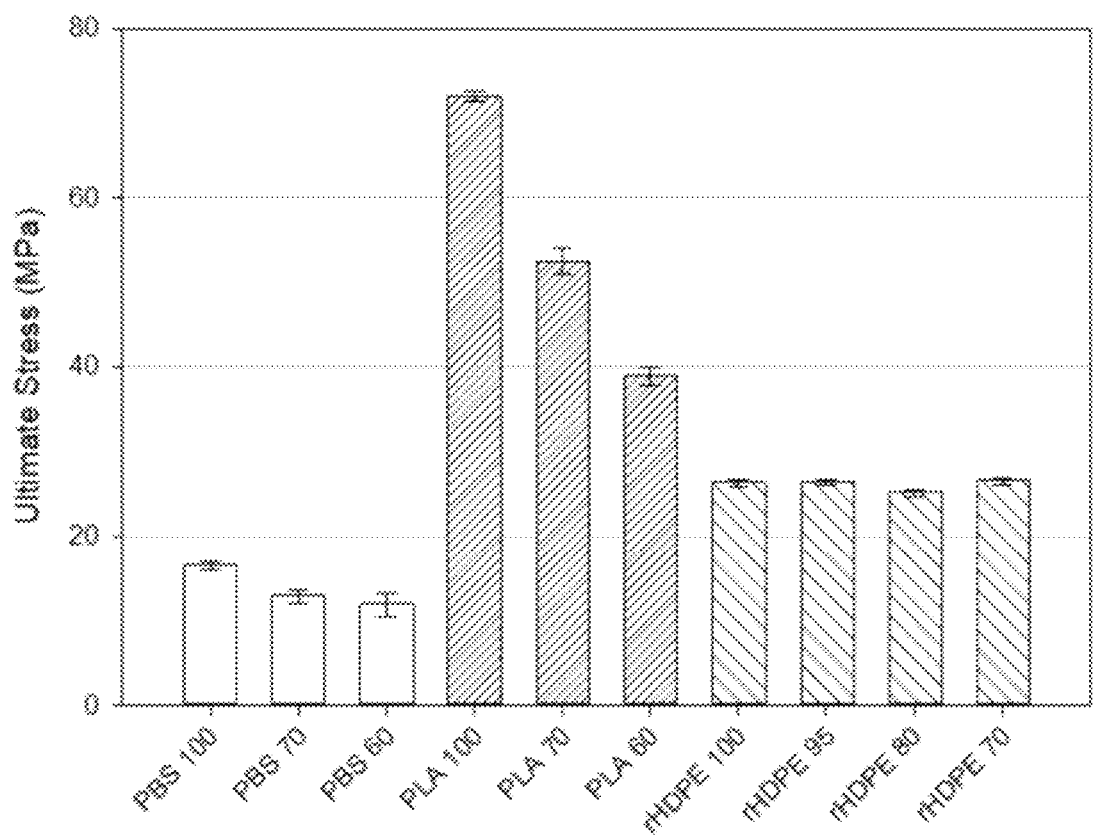
FIG. 1 is a chart showing data for strength testing for polybutylene succinate, polylactic acid, and recycled high-density polyethylene filled with various amounts of spent filter media/cake containing diatomaceous earth.

It has been discovered that spent filter media material, such as containing diatomaceous earth and/or perlite, can be used directly from a filtration system may be used as a filler in various plastics. It should be understood that while the below discussion and examples note the use of diatomaceous earth, perlite may also be used in addition to and/or as a replacement for diatomaceous earth.

Spent filter media often will include other processing aids, such as carbon, ion exchange materials, surfactants, and the like, in addition to diatomaceous earth and filtration residues such as organic and mineral residues. Typically, the spent filter media material will contain about 30-95% by weight of diatomaceous earth or perlite, but more typically it will contain about 10-50% by weight organic carbon, 1-25% by weight of activated carbon, and about 20-50% water. As obtained from a commercial maltodextrin purification process the spent filter media typically contains 3-10% crude protein, about 3-8% crude fat, about 10-20% fiber, 27-45% total digestible nutrients, and will further include one or more of iron, sulfur, phosphorous, sodium, calcium, magnesium, copper, and zinc. The spent diatomaceous earth or perlite filter media may be obtained from any suitable process, such as a maltodextrin production process, a beer brewing process, or any other suitable process. Different filtration processes will yield different forms of spent diatomaceous earth.

Spent perlite may be used and may contain similar materials that have been picked up during the filtration process. Virgin perlite generally includes silicon dioxide, aluminum oxide, potassium oxide, sodium oxide, calcium oxide, and other trace elements. The perlite may also contain iron oxide, magnesium oxide, and the like. In one form, perlite may contain about 70-75% silicon dioxide, about 12-20% aluminum oxide, about 3-5% potassium oxide, about 3-4% sodium oxide, and about 0.5-1.5% calcium oxide. The virgin perlite may also have generally negligible amount of water. The perlite material may also have a variety of densities and particle sizes. For example, a dry density of about 6-10 $lb/ft^3$ and/or a cake density of 7-12 $lb/ft^3$. Further, the mean particle size may range from about 20 to about 100 microns. The overall size may range from about 5 to about 300 microns.

It should also be appreciated that virgin diatomaceous earth may also be used. Typically virgin diatomaceous earth contains less than about 1% moisture, which oftentimes is significantly less than spent filter media. Virgin diatomaceous earth with added carbon may be used. In some forms the ratio of activated carbon to virgin diatomaceous earth is about 1:4 and the carbon may contain additional moisture, such as about 3.6% moisture. Perlite may include a similar amount of activated carbon, such as in a range of about 1:3-1:4, as desired. Both of these types of materials may be used in similar amounts as the spent filter media.

To form a filled plastic composition, a plastic material is blended with the spent filter media, such as diatomaceous earth and/or perlite. The plastic material in blended with a diatomaceous earth filter media to form a filled plastic composition having a loading level of 1%-45% diatomaceous earth material, by which is contemplated as spent diatomaceous earth or residue from diatomaceous earth. Some of the diatomaceous earth may be destroyed or structurally modified during the extrusion process. For example, the loading level of spent diatomaceous earth, perlite, or residue may be 5%, 10%, 15%, 20%, 25%, 30%, 35%, 40%, or 45%, these percentages being expressed as a percentage of diatomaceous earth and/or perlite material of the total weight of the filled plastic composition.

Typically, the plastic is a thermoplastic material and the blending is accomplished by raising the temperature of the thermoplastic material to above the melting point and blending the diatomaceous earth and/or perlite therewith. While not necessary, in some embodiments an extruder, such as a twin-screw co-rotating extruder, may be used to blend the diatomaceous earth and/or perlite with the plastic material. One surprising feature of this process is that the spent filter media material may be used as-is, i.e., with included moisture, with no need to dry the spent filter material prior to blending. When performed in an extruder, the temperature of at least one zone of the extruder should be sufficiently high to drive off or off-gas the water that is present in the starting materials. The presence of water may also serve as a processing aid in the extrusion process. Generally, a suitable temperature range in the extruder is in the range from 90°-170° C.

Any suitable plastic material, but in particular thermoplastic plastic materials, may be employed in conjunction with the invention. For instance, petrochemical plastics such as high-density polyethylene and in particular recycled high-density polyethylene (rHDPE) may be employed as the base plastic material. Other materials such as polypropylene and in particular recycled polypropylene (rPP) may be employed as the base plastic material. Alternatively, plant-derived polymers, such as polybutylene succinate (PBS), a sugar based degradable plastic, or polylactic acid (PLA) a corn-derived degradable plastic, may be employed as the base plastic material. When PLA or PBS are employed, these materials generally should be dried prior to extrusion, although it is contemplated that this drying step may not be necessary.

Upon extrusion, the extruded product may be formed into pellets and added to a container (such as a bag) for transport and subsequent use. Alternatively, or subsequent thereto, the extruded plastic material may be formed into various useful implements such as cat litter scoops or eating utensils, or any other application where molded plastics are suitable.

The mechanical properties of the plastic material may degrade somewhat as filler is added and as the amount of filler increases, although the mechanical properties may remain suitable for the intended application. It is contemplated in some embodiments that the use of diatomaceous earth and/or perlite filler will result in a lower-cost material than would be realized without the use of the filler.

The following non-limiting examples are provided for illustration.

Example 1

Virgin diatomaceous earth (DE), virgin diatomaceous earth with added carbon (CDE), and spent filter media/cake containing diatomaceous earth (SC) were blended with rHDPE, PLA, and PBS. Spent filter media/cake containing diatomaceous earth (SC) was blended with rPP. The spent cake containing diatomaceous earth was used as-received, with moisture content and with filtration additives. The rHDPE and rPP were also used as-received, while the PLA and PBS were dried prior to extrusion. All but one of the plastic materials were compounded in a twin-screw 18-mm co-rotating extruder while the rPP was compounded in a 27-mm co-rotating extruder. The materials were prepared at various loading levels using the following conditions. The testing and results of these different materials are summarized in the following results.

TABLE 1

|  | Feed Zone 1 | Zone 2 | Zone 3 | Zone 4 | Zone 5 | Zone 6 | Zone 7 | Die Zone 8 |
| --- | --- | --- | --- | --- | --- | --- | --- | --- |
| rHDPE | 160° C. | 165° C. | 165° C. | 170° C. | 175° C. | 175° C. | 175° C. | 170° C. |
| PLA | 90° C. | 95° C. | 100° C. | 110° C. | 115° C. | 115° C. | 110° C. | 105° C. |
| PBA | 150° C. | 150° C. | 155° C. | 165° C. | 170° C. | 165° C. | 165° C. | 160° C. |
| rPP | 165° C. | 170° C. | 175° C. | 180° C. | 185° C. | 185° C. | 185° C. | 180° C. |

Example 2

In Examples 2-4, ultimate tensile strength (UTS), 0.2% yielding strength, Young's modulus, and percent elongation at peak stress were calculated from a constant cross head displacement for 10 specimens within each sample group. Tensile tests were performed using an Instron testing frame. Tensile tests were conducted according to ASTM D638-14 for Type I specimens with a testing speed of 50 mm/min. Cross sectional area of specimens was calculated prior to test with a Fowler electronic caliper and assumed constant throughout testing. This assumption was then used to determine the percent elongation absent an extension meter.

The following materials were evaluated.

TABLE 2

| PBS (100%) |
| PBS (70%)/SC (30%) |
| PBS (60%)/SC (40%) |
| PLA (100%) |
| PLA (70%)/SC (30%) |
| PLA (60%)/SC (40%) |
| rHDPE (100%) |
| rHDPE (95%)/SC (5%) |
| rHDPE (80%)/SC (20%) |
| rHDPE (70%)/SC (30%) |
| rPP (100%) |
| rPP (95%)/SC (5%) |
| rPP 80%)/SC (20%) |
| rPP (70%)/SC (30%) |
| rPP (60%)/SC (40%) |

Ultimate tensile strength was evaluated for these materials and the results shown in FIG. 1 were obtained. Also prepared was a filled plastic product prepared from rHDPE (60%)/SC (40%).

It is seen that, overall, PLA exhibited the highest ultimate strength while PBS exhibited the lowest strength. Further, in general, it was seen the ultimate strength is inversely proportional to the amount of SC for PBS and PLA. The effect is reduced for PBS as compared to PLA and the effect was not seen for rHDPE, suggesting better compatibility between SC and rHDPE and better compatibility for PBS as compared to PLA.

Example 3

Figure 2:
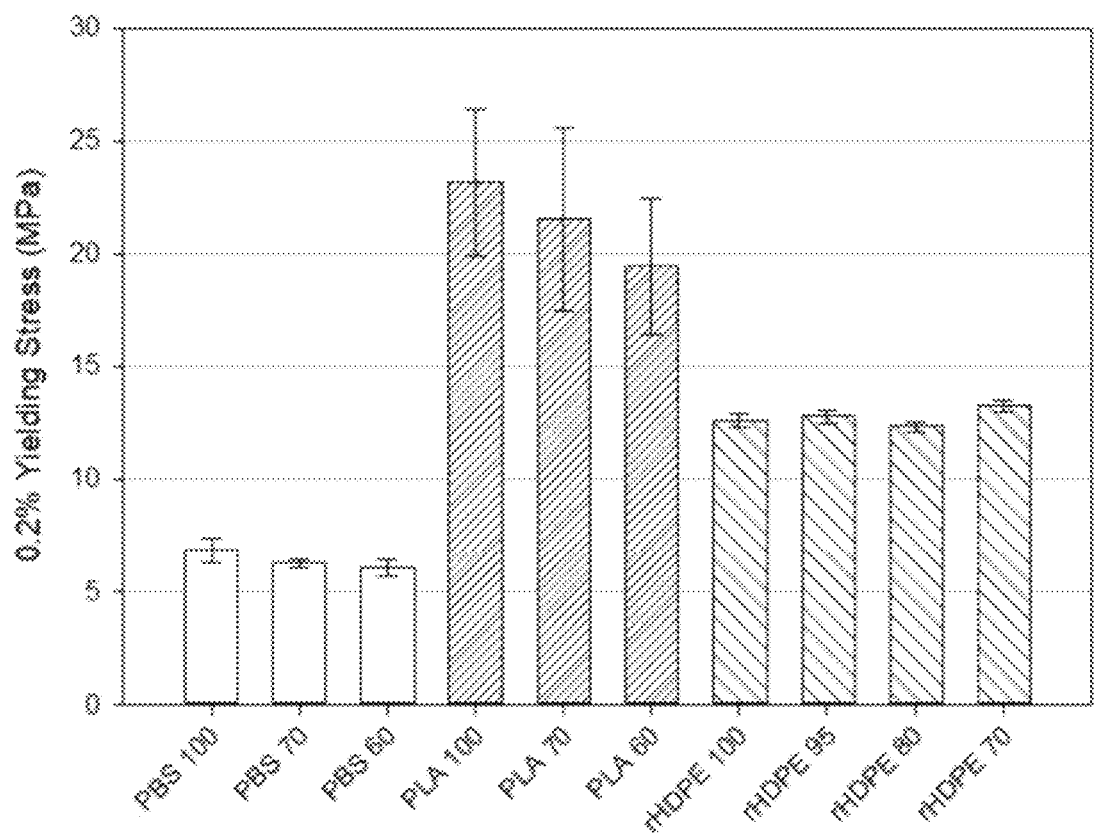
FIG. 2 is a chart showing data for the 0.2% yield strength for the same materials evaluated and reported in FIG. 1.

The 0.2% yield strength was evaluated, yielding the results shown in FIG. 2. The results follow similar trends as for the ultimate strength evaluated as in Example 2.

Example 4

Figure 3:
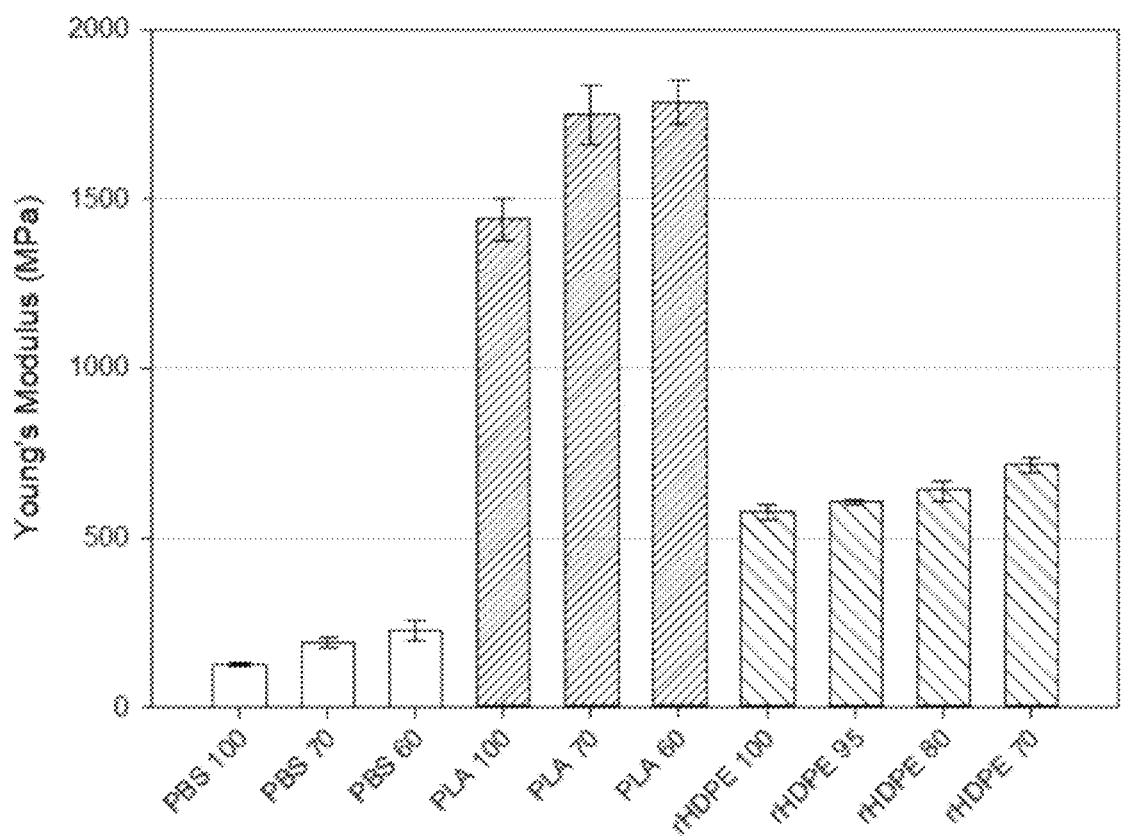
FIG. 3 is a chart illustrating the Young's modulus for the same materials evaluated and reported in FIG. 1.

Young's modulus was determined for the evaluated materials, yielding the results shown in FIG. 3. As seen, the Young's modulus was generally proportional to the relative amount of SC in the filled plastic composition. This result is expected because SC is relatively stiff compared to the base plastic materials, such that an increased amount of SC would be expected to increase the amount of stiffness of the compounded materials.

Example 5

Figure 4:
FIG. 4 is a perspective view of an exemplary litter scoop prepared using recycled high-density polyethylene filled with a spent diatomaceous earth filler.

A litter scoop is prepared using rHDPE (80%) and DE (20%). The litter scoop is shown in FIG. 4.

Example 6

Figure 5:
FIG. 5 is a perspective view of an exemplary spoon prepared using fill recycled high-density polyethylene filled with a spent diatomaceous earth filler.

A spoon intended as a utensil for human use is prepared using rHDPE (80%) and DE (20%). The spoon is shown in FIG. 5.

It is thus seen that spent diatomaceous earth may be used as a filler in plastic materials.

Example 7

The ultimate strength of additional samples and compared to some of the samples from Example 2. As found in FIGS. 6-10, each material is denoted with a letter representing the base material, such as PBS, PLA, rHDPE, and rPP. The letters after the dash represent the type of filler material, such as DE, CDE, and SC. The number then denotes the amount (wt. %) of the base material with the remainder being the filler material. For instance, PBS-DE 70 would represent 70% polybutylene succinate with 30% diatomaceous earth.

In FIGS. 6-15, the identifiers "$1^{st}$" and "$2^{nd}$" refer to initial tests ($1^{st}$) and later tests ($2^{nd}$) on the type of plastic material. In the case of PBS, the $2^{nd}$ test was performed on material that had a higher molecular weight than the $1^{st}$ test material. Further, PBS-DE 70, PBS-DE 60, PBS-CDE 70, and PBS-CDE 60 were prepared using the higher molecular weight material from the $2^{nd}$ test material. The $1^{st}$ and $2^{nd}$ identifiers for the remaining materials generally included similar base plastic materials for the different series of tests.

Figure 6:
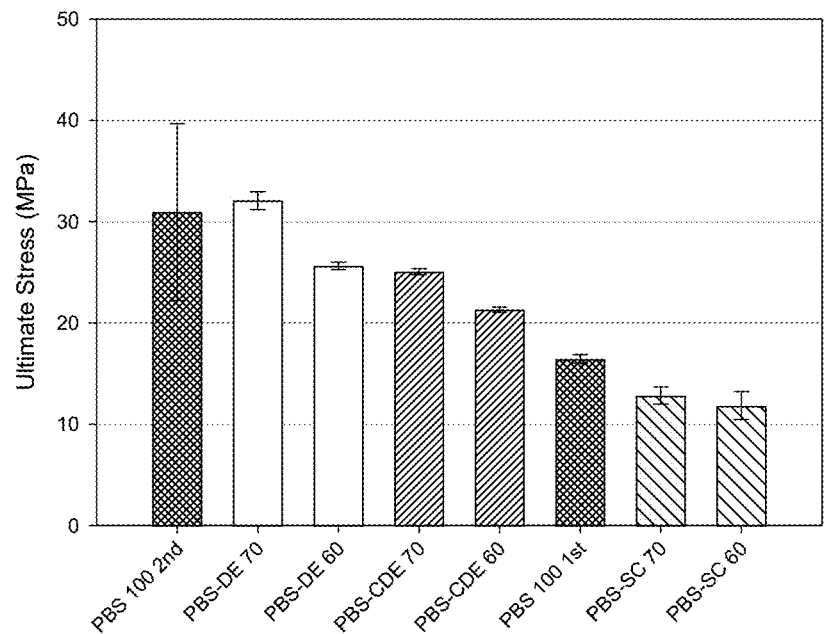
FIG. 6 is a chart showing data for strength for polybutylene succinate with various amounts of diatomaceous earth, diatomaceous earth with carbon, and spent filter media/cake containing diatomaceous earth.

More specifically, additional samples of polybutylene succinate (PBS) were tested and evaluated for ultimate strength with the results presented in FIG. 6. As noted above, different molecular weight materials were used in the PBS tests. However, even when higher molecular weight material was used, increasing addition of different forms of diatomaceous earth showed similar trends in resulting properties of the materials.

Figure 7:
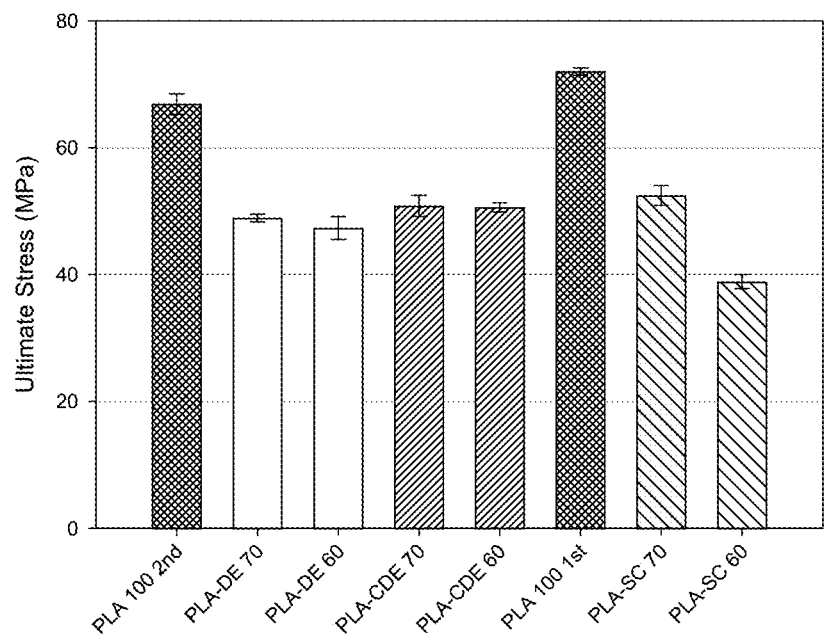
FIG. 7 is a chart showing data for strength for polylactic acid with various amounts of diatomaceous earth, diatomaceous earth with carbon, and spent filter media/cake containing diatomaceous earth.
Figure 8:
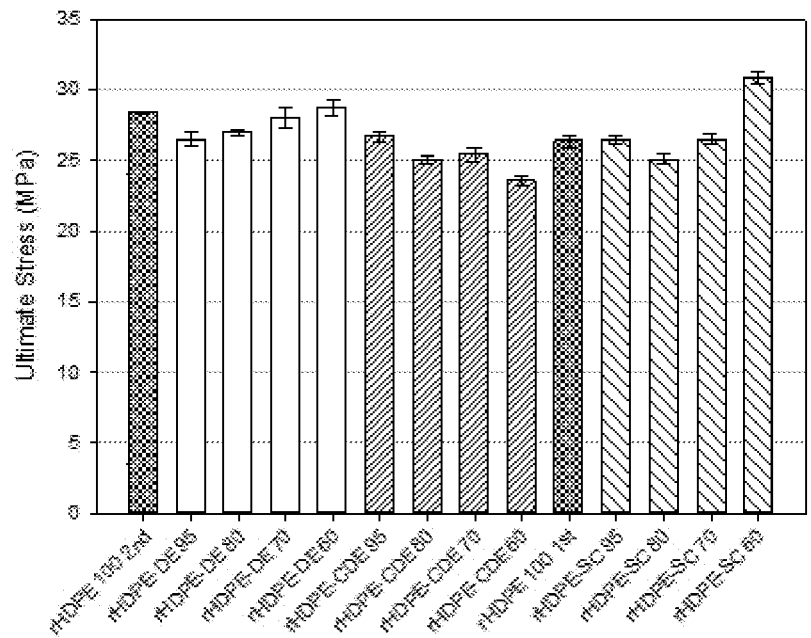
FIG. 8 is a chart showing data for strength for recycled high-density polyethylene with various amounts of diatomaceous earth, diatomaceous earth with carbon, and spent filter media/cake containing diatomaceous earth.
Figure 9:
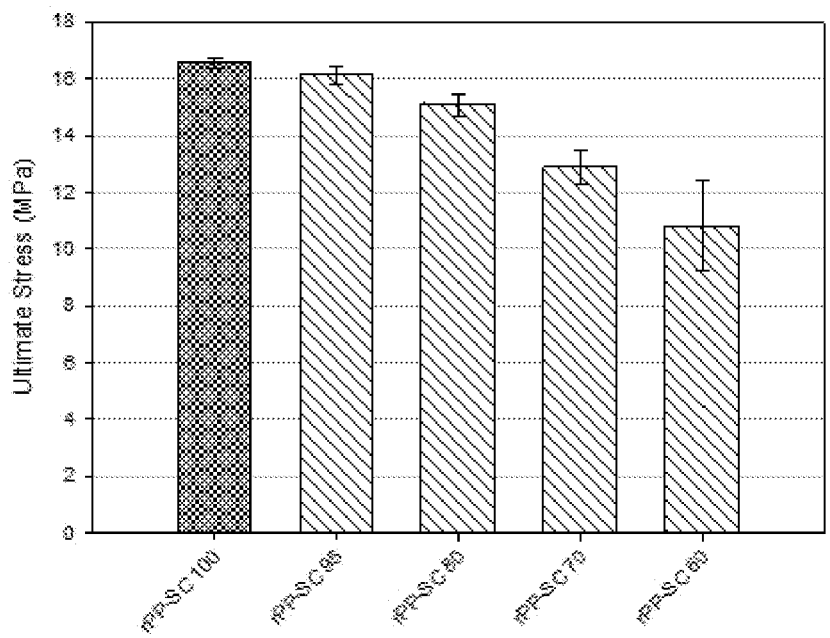
FIG. 9 is a chart showing data for strength for recycled polypropylene with various amounts of spent filter media/cake containing diatomaceous earth.

Additional samples of polylactic acid were tested and evaluated for ultimate strength with the results presented in FIG. 7. Additional samples of recycled high-density polyethylene were tested and evaluated for ultimate strength with the results presented in FIG. 8. Additional samples of recycled polypropylene were tested and evaluated for ultimate strength with the results presented in FIG. 9.

Figure 10:
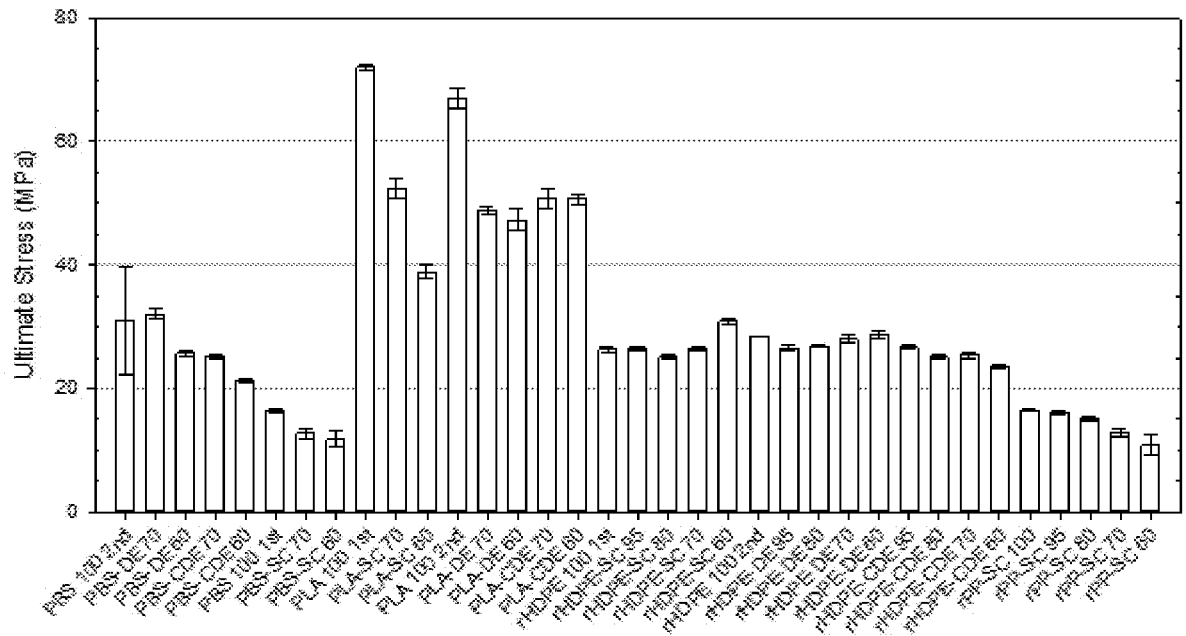
FIG. 10 is a chart showing a comparison of the data from FIGS. 6-9.

A comparison of the results of FIGS. 6-9 is presented in FIG. 10. It is seen that overall, PLA has the highest ultimate strength and the PBS has the lowest strength. In addition, it is seen that in general the ultimate strength is generally inversely proportional to amounts of fillers. This effect is not seen for rHDPE and minimally for PBS, suggesting potentially better compatibility between fillers and rHDPE and PBS compared to PLA and rPP.

Example 8

The Young's modulus was determined for additional samples and compared to some of the samples from Example 4. As found in FIGS. 11-15, each material is denoted with a letters representing the base material, such as PBS, PLA, rHDPE, and rPP. The letters after the dash represent the type of filler material, such as DE, CDE, and SC. The number then denotes the amount (wt. %) of the base material with the remainder being the filler material. These identifiers are similar to those used in Example 7 with identical identifiers referring to the same materials in Examples 7 and 8.

Figure 11:
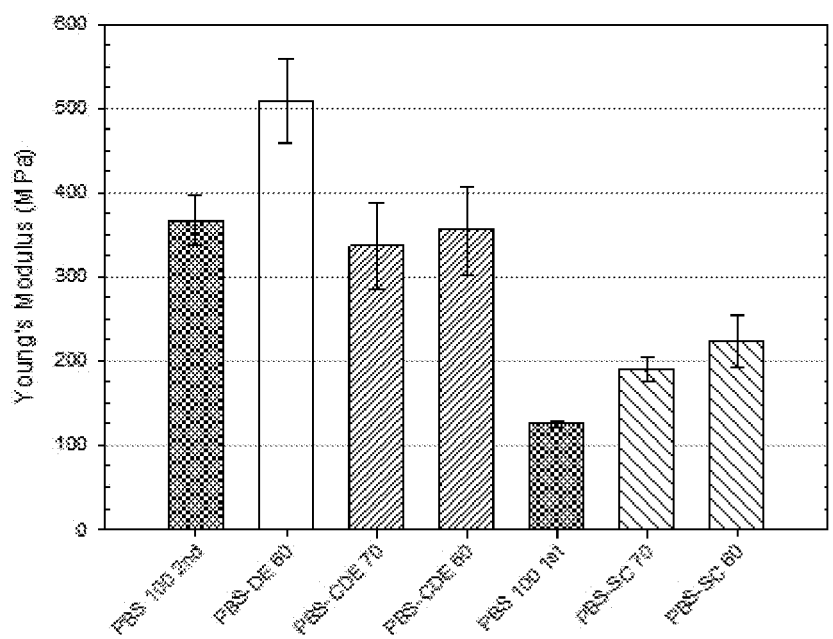
FIG. 11 is a chart illustrating the Young's modulus for many of the same materials evaluated and reported in FIG. 6.
Figure 12:
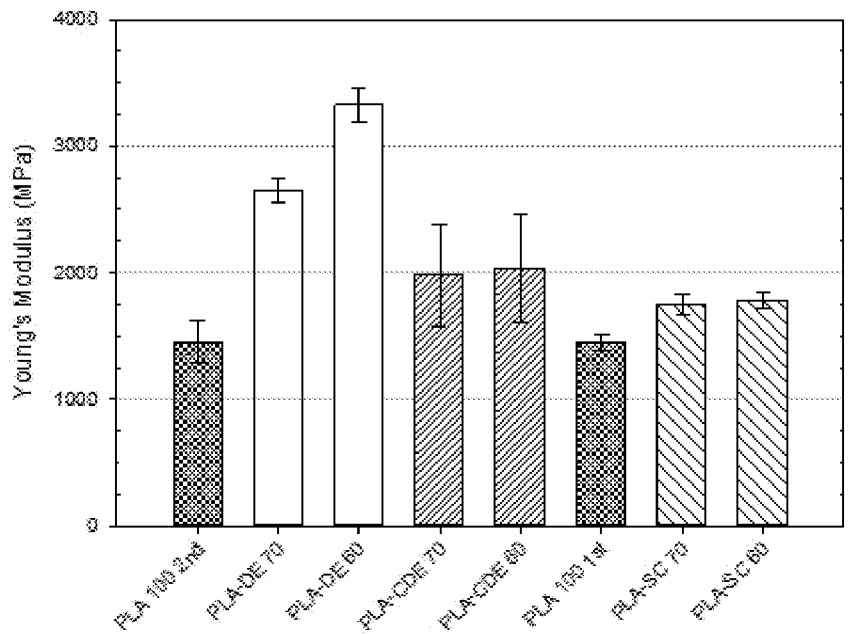
FIG. 12 is a chart illustrating the Young's modulus for the same materials evaluated and reported in FIG. 7.
Figure 13:
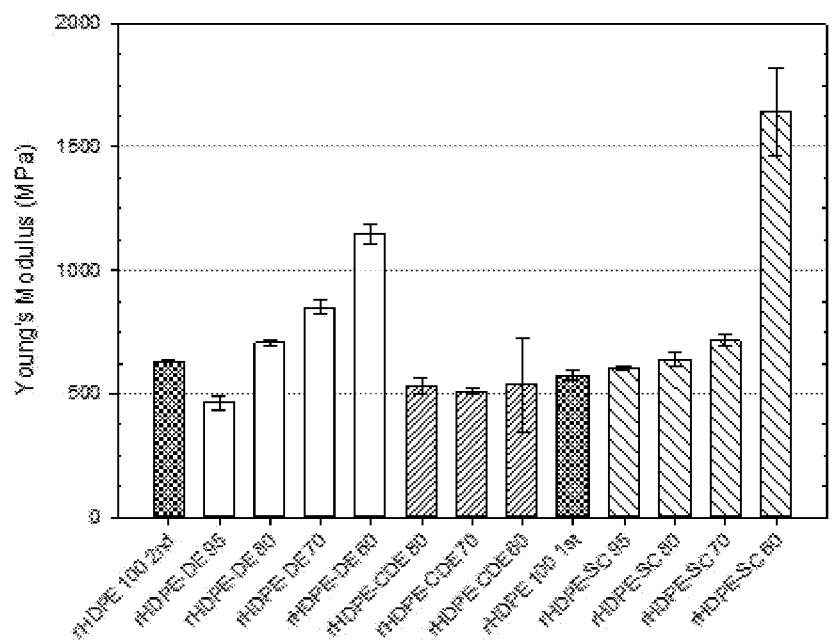
FIG. 13 is a chart illustrating the Young's modulus for many of the same materials evaluated and reported in FIG. 8.
Figure 14:
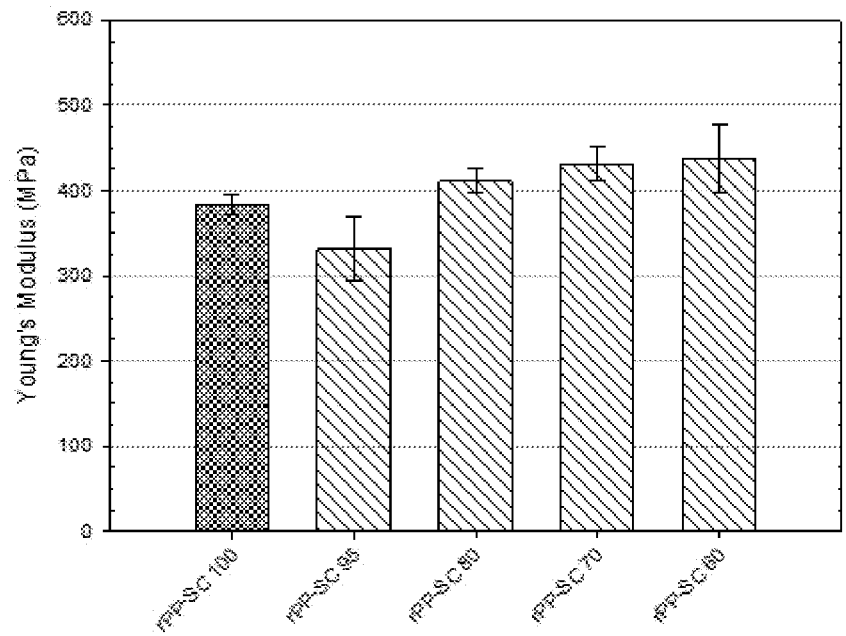
FIG. 14 is a chart illustrating the Young's modulus for the same materials evaluated and reported in FIG. 9.

Young's modulus for additional samples of polybutylene succinate (PBS) was determined with the results presented in FIG. 11. Young's modulus for additional samples of polylactic acid was determined with the results presented in FIG. 12. Young's modulus for additional samples of recycled high-density polyethylene was determined with the results presented in FIG. 13. Young's modulus for additional samples of recycled polypropylene was determined with the results presented in FIG. 14.

Figure 15:
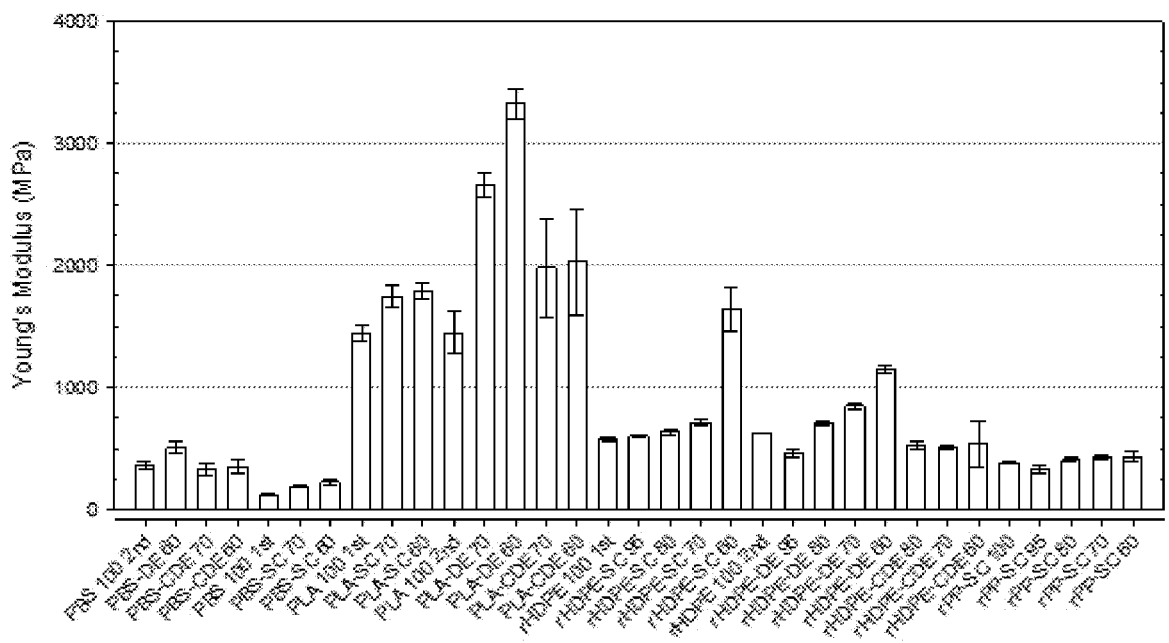
FIG. 15 is a chart showing a comparison of the data from FIGS. 11-14.

A comparison of the results of FIGS. 11-14 is presented in FIG. 15. In general, the Young's modulus is proportional to relative amount of DE, CDE, and SC. This is expected because the fillers DE, CDE, and SC are relatively stiff compared to the plastics which increases the stiffness of the compounded materials.

Scanning electron microscopy (SEM) was performed on fracture surfaces of many of the samples described in the above Examples. More specifically images were taken at 150×, 500×, and 1500× magnification for various combinations of base materials and fillers.

Figure 16:
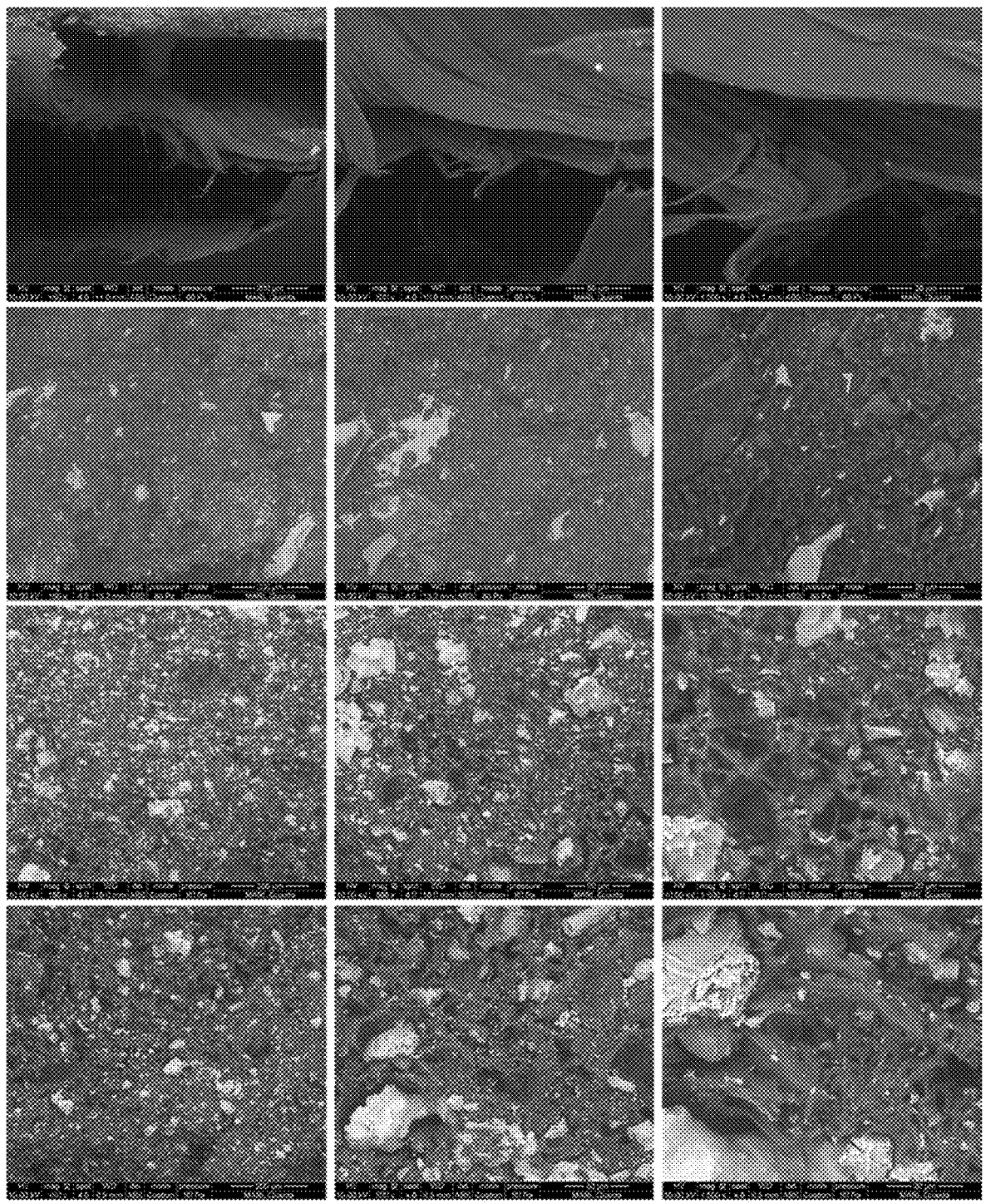
FIG. 16 is a compilation of scanning electron microscope (SEM) images of various combinations of recycled high-density polyethylene at 150×, 500×, and 1500× magnification.

FIG. 16 provides images for rHDPE with varying amounts of filler materials. Starting at the top left hand side and going down the column, rHDPE is shown with no filler, rHDPE with 40% SC, rHDPE with 40% DE, and rHDPE with 40% CDE, respectively at 150× magnification. The second and third columns from left to right are the same respective samples as the first column, just at 500× and 1500× magnification.

As seen in in the top row of FIG. 16, for rHDPE with no SC, DE or CDE, the fracture surface demonstrates significant deformation, which is consistent with a low Young's modulus (low stiffness high flexibility). With the addition of 40% SC, 40% DE and 40% CDE, the fracture surface appears relatively smooth which would suggest brittle fracture, however this is not seen in the mechanical results presented above. It is seen that the SC, DE, and CDE particles are well dispersed and appear to have good interfacial bonding between with the rHDPE, which would suggest good compatibility between fillers SC, DE and CDE with rHDPE.

Figure 17:
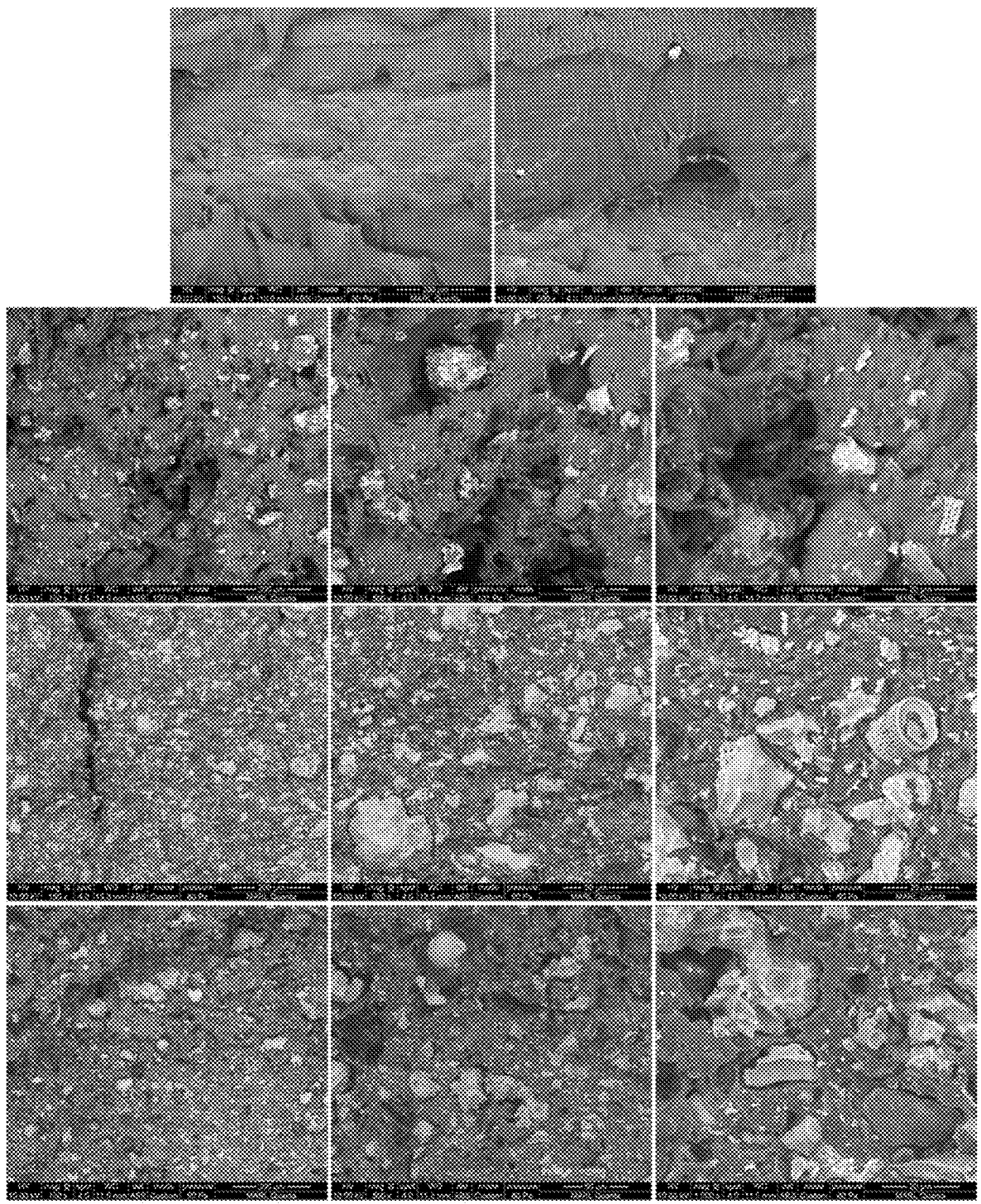
FIG. 17 is a compilation of scanning electron microscope (SEM) images of various combinations of polybutylene succinate at 150×, 500×, and 1500× magnification.

FIG. 17 provides images for PBS with varying amounts of filler materials. Starting at the top left hand side and going down the column, PBS is shown with no filler, PBS with 40% SC, PBS with 40% DE, and PBS with 40% CDE, respectively at 150× magnification. The second and third columns from left to right are the same respective samples as the first column, just at 500× and 1500× magnification. The top row only includes magnification at 150× and 500×.

As seen in the top row of FIG. 17, for PBS with no SC, DE, or CDE, the fracture surface demonstrates significant deformation, which is consistent with a low Young's modulus (low stiffness high flexibility). Going down the rows of FIG. 17, it is seen that there is little difference between the fracture surfaces of the SC, DE, and CDE. All fillers are well dispersed in the PBS. However, DE fracture surface shows the smoothest surfaces indicating failure of the matrix suggesting better adhesion compared to SC and CDE which is also consistent with the mechanical properties discussed above.

Figure 18:
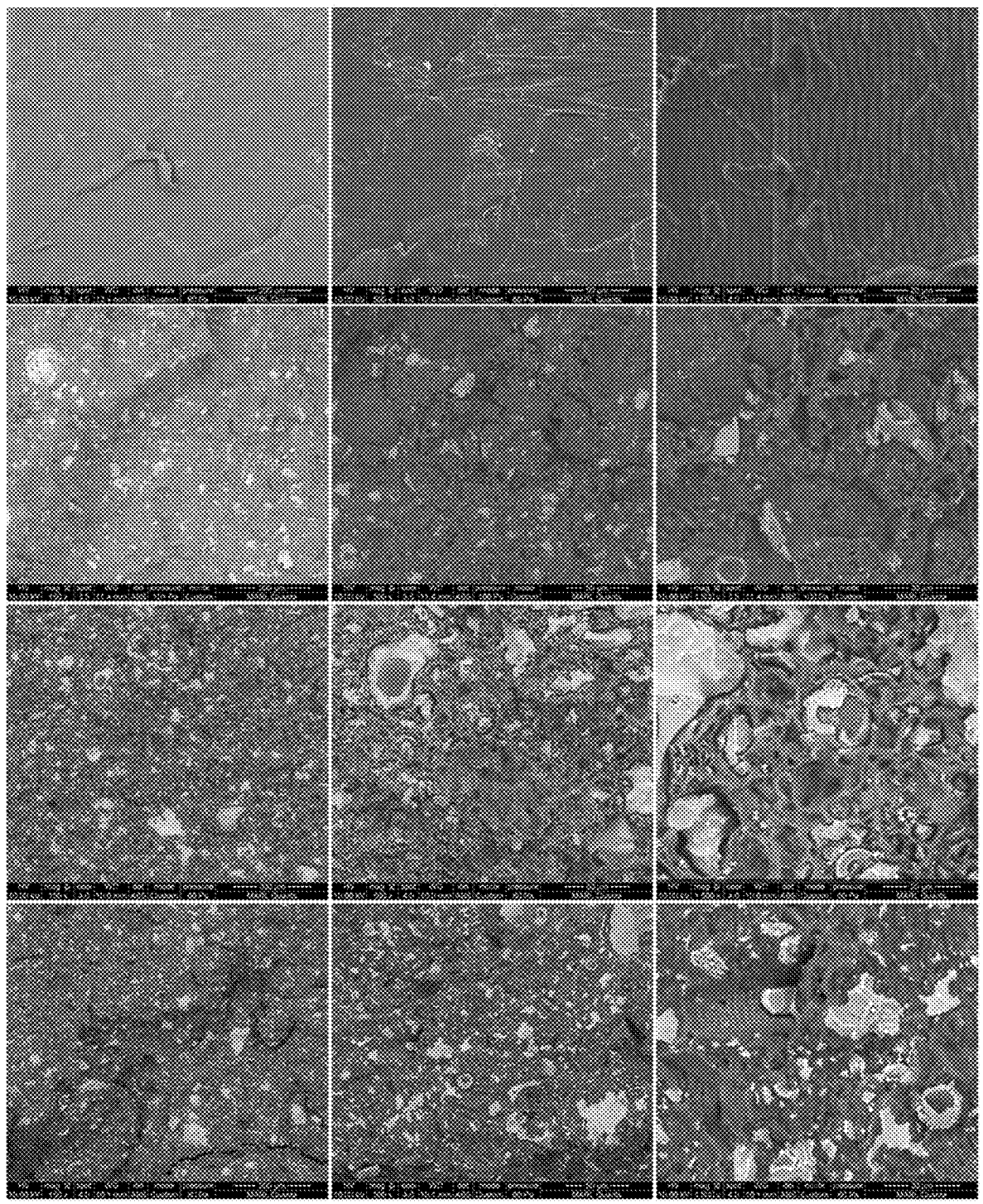
FIG. 18 is a compilation of scanning electron microscope (SEM) images of various combinations of polylactic acid at 150×, 500×, and 1500× magnification.

FIG. 18 provides images for PLA with varying amounts of filler materials. Starting at the top left hand side and going down the column, PLA is shown with no filler, PLA with 40% SC, PLA with 40% DE, and PLA with 40% CDE, respectively at 150× magnification. The second and third columns from left to right are the same respective samples as the first column, just at 500× and 1500× magnification.

As seen in the top row of FIG. 18, for PLA with no SC, DE or CDE, the fracture surface of the PLA is smooth with chevron edges, suggesting a brittle failure which is consistent with the mechanical properties. Going down the rows of FIG. 18, it is seen that SC, DE, and CDE particles are well dispersed and appear to have poor adhesion with the PLA, which is consistent with the mechanical properties as CDE, DE, and SC had overall negative effects on strength when compounded with PLA.

Figure 19:
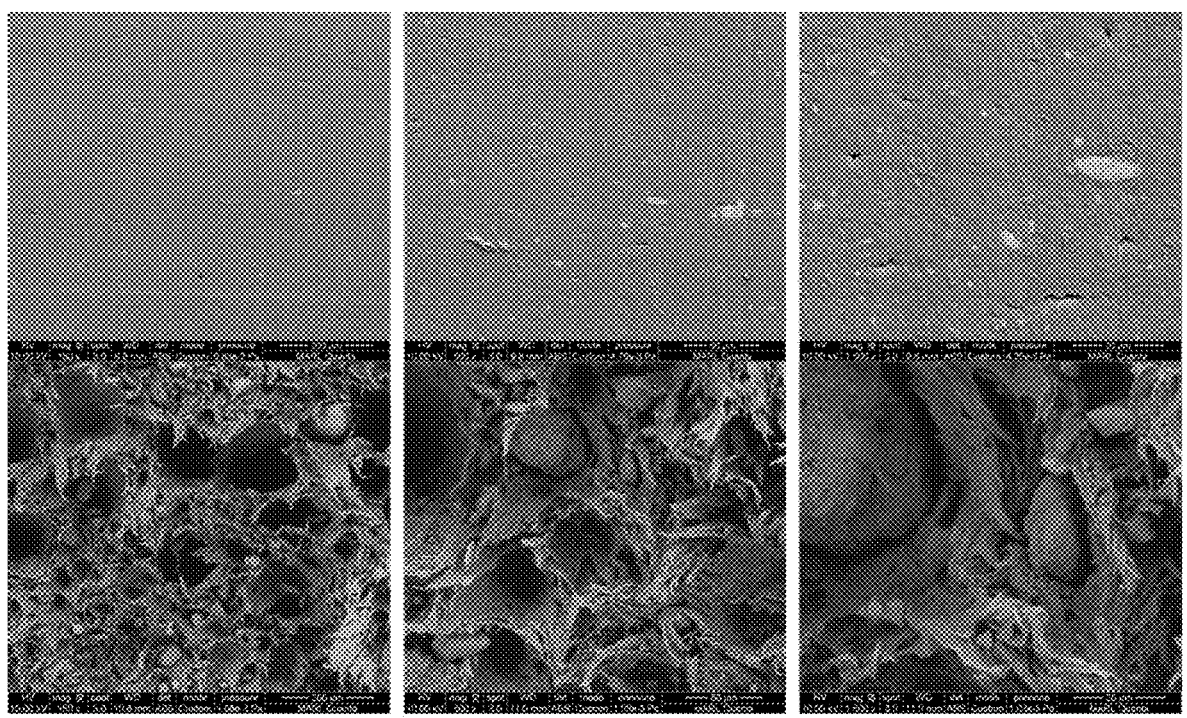
FIG. 19 is a compilation of scanning electron microscope (SEM) images of various combinations of recycled polypropylene at 150×, 500×, and 1500× magnification.

FIG. 19 provides images for rPP with varying amounts of filler materials. Starting at the top left hand side and going down the column, rPP is shown with no filler and rPP with 40% SC respectively at 150× magnification. The second and third columns from left to right are the same respective samples as the first column, just at 500× and 1500× magnification.

As seen in the top row of FIG. 19, for rPP with no SC, the fracture surface demonstrates significant deformation, which is consistent with a low Young's modulus (low stiffness high flexibility). With the addition of 40% SC in the second row, the fracture surface appears relatively smooth which would suggest brittle fracture. However, this is not seen in the mechanical results. It is seen that the SC particles are well dispersed and appear to have good interfacial bonding between with the rPP, which would suggest good compatibility between SC and rPP.

Figure 20:
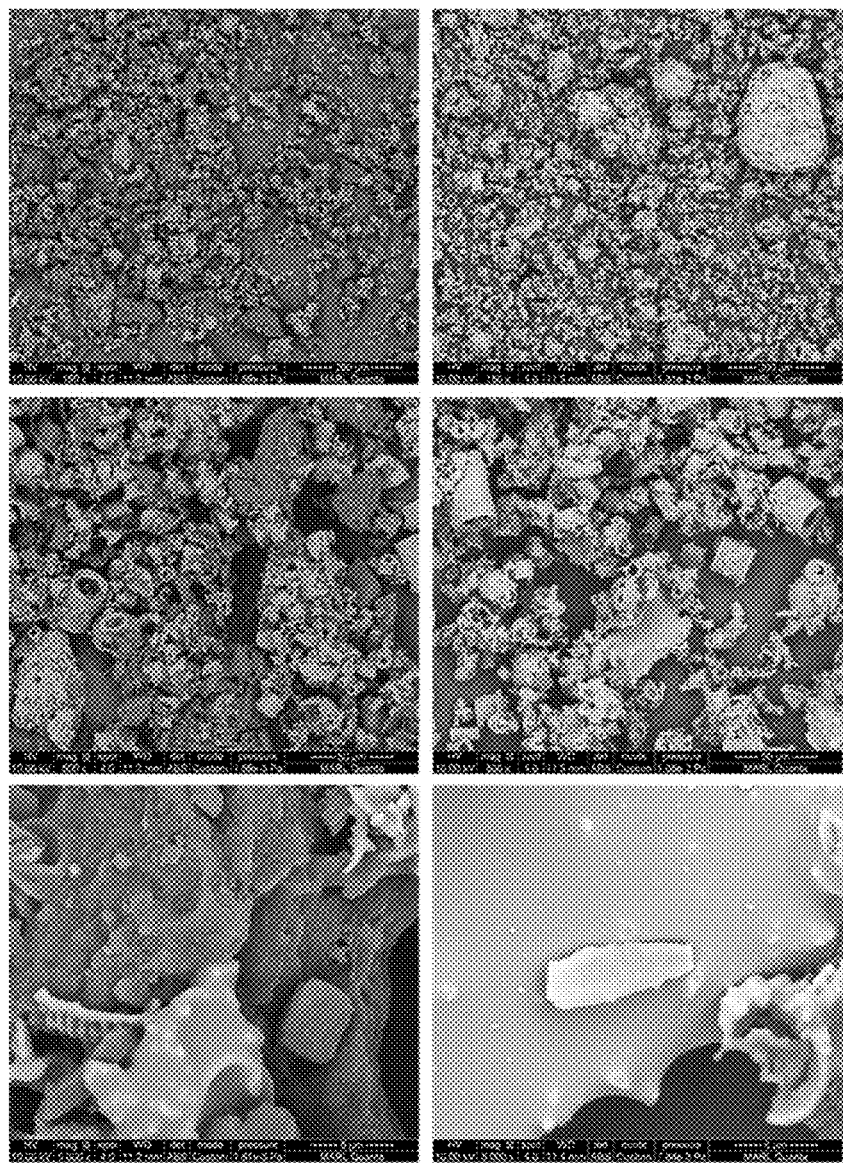
FIG. 20 is a compilation of scanning electron microscope (SEM) images of diatomaceous earth as well as untreated diatomaceous earth containing added carbon at 150×, 500×, and 1500× magnification.

FIG. 20 provides images raw untreated CDE and DE. Images for CDE are shown in the left hand column at 150×, 500×, and 5000×, going from top to bottom respectively. Images for DE are shown in the right hand column at 150×, 500×, and 5000×, going from top to bottom respectively.

It has been observed via scanning electron microscopy that diatomaceous earth exhibits good interfacial bonding with rHDPE, which indicates good compatibility between these materials. Scanning electron microscopy of PBS and diatomaceous earth at a 40% loading level illustrates good dispersion of the diatomaceous earth in the PBS material. At a 40% loading level in PLA, DE particles are not well dispersed and appear to have poor adhesion with the PLA, suggesting that the inclusion of diatomaceous earth in greater amounts will result in somewhat poor physical properties, although these properties may be acceptable for certain applications.

From the above results, it should be understood that CDE, DE, and SC can be effectively incorporated into a variety of base materials, such as PBS, PLA, rHDPE, and rPP. The filler material can be incorporated with loads as high as 40% or more, depending on the properties desired in the resulting material. Further, when filler is added, the loss of mechanical properties is minimal for rHDPE, PBS, and rPP but can be significant with PLA. PLA also has the highest strength and stiffness of the materials studied but can be difficult to injection mold.

Further, DE overall has better bonding compared to CDE and SC with rHDPE, and PBS, but not PLA. In some forms, rHDPE when compounded with DE, CDE, or SC at 30% and 40% filler loading can provide a desirable strength/stiffness ratio for the application of a composite material for making litter scoops.

It should be appreciated that spent perlite alone and/or with spent diatomaceous earth may be used in the amounts and ratios as found in the above examples.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

The invention claimed is:

1. A method comprising:
    providing a plastic material;
    providing spent filter media including spent diatomaceous earth, perlite, and/or residues thereof, the spent filter media containing from 20% to 50% by total weight water and including filtrates, and
    blending said plastic material with said spent filter media to form a filled plastic composition, the spent diatomaceous earth, perlite, and/or residue thereof being present in said filled plastic composition in an amount ranging from 1 to 40% by dry weight of the filled plastic composition.

2. A method according to claim 1, said plastic material comprising one or more of recycled high-density polyethylene; polybutylene succinate, recycled polypropylene, and polylactic acid.

3. A method according to claim 1, said blending being performed by extruding a mixture of the plastic material and the spent filter media.

4. A method according to claim 1, said extrusion being performed in a multi zone extruder.

5. A method according to claim 4, the temperature in said extruder being in the range from 90°-170° C. and being sufficiently high in at least one zone to flash off moisture from said spent filter media.

6. A method according to claim 1, said spent filter media comprising filter media from a brewing process.

7. A filled plastic composition comprising:
    a plastic material filled with a spent filter media,
    the spent filter media including spent diatomaceous earth, spent perlite, and/or residues thereof,
    the spent diatomaceous earth, spent perlite, and/or residues thereof being present in said filled plastic composition in an amount ranging from 1 to 45% by dry weight of the filled plastic composition, the filled plastic composition comprising mineral residues from a filtration process.

8. A filled plastic composition according to claim 7, said plastic material comprising one or more of recycled high-density polyethylene, polybutylene succinate, recycled polypropylene, and polylactic acid.

9. A filled plastic composition according to claim 7, comprising organic residues from a filtration process.

10. A litter scoop comprising the filled plastic composition of claim 7, formed into the shape of a slotted scoop.

11. The litter scoop of claim 10 wherein the plastic composition comprises one or more of recycled polypropylene and recycled high-density polyethylene.

12. The litter scoop of claim 11 wherein the plastic composition further comprises spent diatomaceous earth filter media in an amount of 30% to 40%.

13. A spoon comprising a handle portion and bowl portion, said spoon being formed of the filled plastic composition of claim 7.

\* \* \* \* \*